(12) United States Patent
Zweig et al.

(10) Patent No.: US 10,975,248 B2
(45) Date of Patent: *Apr. 13, 2021

(54) TEMPORARY PROTECTIVE COATINGS AND METHODS

(71) Applicant: The Boeing Company, Chicago, IL (US)

(72) Inventors: Andrew M. Zweig, Ellisville, MO (US); Eric A. Bruton, St. Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 142 days.

This patent is subject to a terminal disclaimer.

(21) Appl. No.: 16/245,147

(22) Filed: Jan. 10, 2019

(65) Prior Publication Data

US 2020/0224041 A1 Jul. 16, 2020

(51) Int. Cl.
| | |
|---|---|
| *C09D 5/20* | (2006.01) |
| *C09D 133/08* | (2006.01) |
| *C09D 7/65* | (2018.01) |
| *C23C 22/78* | (2006.01) |
| *C23C 22/83* | (2006.01) |
| *C09D 7/61* | (2018.01) |
| *C08K 3/34* | (2006.01) |
| *C08L 23/06* | (2006.01) |

(52) U.S. Cl.
CPC .............. *C09D 5/20* (2013.01); *C09D 7/61* (2018.01); *C09D 7/65* (2018.01); *C09D 133/08* (2013.01); *C23C 22/78* (2013.01); *C23C 22/83* (2013.01); *C08K 3/34* (2013.01); *C08L 23/06* (2013.01)

(58) Field of Classification Search
CPC ... C09D 5/20; C09D 7/65; C09D 7/61; C09D 133/08; C23C 22/78; C23C 22/83; C08K 3/34; C08L 23/06
USPC ........................................................ 524/445
See application file for complete search history.

(56) References Cited

U.S. PATENT DOCUMENTS

| | | | |
|---|---|---|---|
| 3,001,973 A | 9/1961 | Piepenbrink et al. | |
| 3,124,605 A | 3/1964 | Wagner | |
| 3,152,162 A | 10/1964 | Fischer et al. | |
| 3,201,372 A | 8/1965 | Wagner | |
| 3,394,164 A | 7/1968 | McClellan et al. | |
| 3,419,414 A | 12/1968 | Marks | |
| 4,110,317 A | 8/1978 | Moraveck | |
| 5,126,170 A | 6/1992 | Zwiener et al. | |
| 5,236,741 A | 8/1993 | Zwiener et al. | |
| 5,453,459 A | 9/1995 | Roberts | |
| 5,955,201 A * | 9/1999 | Loudermilk ............ | C23C 22/74 428/450 |
| 7,736,730 B2 * | 6/2010 | Jung ........................ | C09D 7/61 428/323 |
| 8,091,227 B2 | 1/2012 | Hong | |

(Continued)

*Primary Examiner* — William K Cheung
(74) *Attorney, Agent, or Firm* — MH2 Technology Law Group LLP (57) ABSTRACT

A temporary protective coating composition for providing a temporary protection to a substrate surface in need thereof. The temporary protective coating composition comprises an aqueous-soluble or alkaline-soluble polymer matrix, one or more compressible fillers, and one or more non-compressible fillers. The disclosure also provides a method for providing a temporary protective coating onto a substrate surface in need thereof for providing indentation and scratch resistance thereto.

20 Claims, 1 Drawing Sheet

(56) References Cited

U.S. PATENT DOCUMENTS

| | | |
|---|---|---|
| 9,719,367 B2 | 8/2017 | Russ |
| 9,863,276 B2 | 1/2018 | Prokup et al. |
| 2002/0176988 A1* | 11/2002 | Medwick ................ B65B 33/04 |
| | | 428/408 |
| 2010/0255279 A1 | 10/2010 | Hong |
| 2013/0045105 A1 | 2/2013 | Driver et al. |
| 2018/0002530 A1 | 1/2018 | Hong |
| 2020/0223556 A1* | 7/2020 | Zweig .................. B64D 41/007 |

* cited by examiner

TEMPORARY PROTECTIVE COATINGS AND METHODS

TECHNICAL FIELD

The present disclosure relates to a temporary protective coating for protecting sheet-metal and other vulnerable substrates surfaces against impact or indentation, scratching, and abrasion.

BACKGROUND

Current temporary protective coatings (hereinafter "TPC") for example, are spray-applied to articles such as aluminum panels or body section prior to full assembly. This TPC protects against environmental damage, and resists some damage from tools used during drilling of holes for lap joints, insertion of temporary and permanent fasteners, and other work being done in the manufacture and assembly of the aircraft. Indentations, and in particular, scratches in aluminum sheet or forms require complex rework and documentation/reporting during manufacture of certain transportation vehicles.

Current temporary coatings, however, can be scratched or compromised by workers and/or machinery during assembly steps. The current temporary coating may be compromised at up to several hundred points during the assembly process. Current temporary coatings are moderately soft and typically offer little protection against scratches from tooling, for example, being dragged across the surface, or compression/indentation marks from tools or other solid objects being pushed against the surface, for example during drilling and fastener insertion.

As current TPCs are not durable and scratch resistant, aesthetic and more involved rework of the part which the TPC is supposed to protect is sometimes required.

SUMMARY

In a first example, a temporary protective coating composition for protecting metal surfaces from indentation and scratching is provided, the temporary coating composition comprising: an aqueous soluble polymer matrix; one or more compressible fillers; and one or more non-compressible fillers. In another example, a temporary protective coating composition for protecting metal surfaces from indentation and scratching is provided, the temporary coating composition consisting essentially of: an aqueous soluble polymer matrix; one or more compressible fillers; and one or more non-compressible fillers.

In another example, the aqueous soluble polymer matrix is soluble in an aqueous alkaline media and removable from the metal surfaces. In another example, alone or in combination with any one of the previous examples, the alkaline-soluble polymer matrix comprises an acrylic polymer or copolymer. In another example, alone or in combination with any one of the previous examples, the one or more compressible fillers are polymer particles present as an emulsion therein. In another example, alone or in combination with any one of the previous examples, the one or more dispersed or distributed compressible fillers are polymer particles comprising polyolefins, thermoplastic elastomers, thermoset rubbers, polyureas, polyamides, polyfluorocarbons, or combinations thereof.

In another example, alone or in combination with any one of the previous examples, the one or more non-compressible fillers are inorganic. In another example, alone or in combination with any one of the previous examples, the one or more non-compressible fillers are selected from clays, magnesium aluminum silicates and/or calcium silicates. In another example, alone or in combination with any one of the previous examples, the one or more compressible fillers are microcrystalline polyethylene and the one or more non-compressible fillers are calcium silicates.

In another example, alone or in combination with any one of the previous examples, the temporary protective coating further comprises one or more of a plasticizer, a leveling agent, an organic solvent, a surfactant, a rheology modifier, a biocide, or a defoamer.

In a second example, a method for protecting against indentation and scratching of a substrate surface in need thereof is provided, the method comprising: contacting a substrate surface with a protective coating comprising layer being selected independently from an aqueous coating composition comprising: an alkaline soluble polymer matrix; one or more compressible fillers; and one or more non-compressible fillers; and providing protection of the substrate surface against indentation and scratching.

In another example, the method further comprises contacting the substrate surface with a primer coating prior to the contacting of the substrate surface with the protective coating.

In another example, alone or in combination with any one of the previous examples, the substrate surface comprises one or more of aluminum, painted aluminum, anodized aluminum, aluminum alloy, titanium, titanium alloy, or stainless steel. In another example, alone or in combination with any one of the previous examples, the substrate surface comprises organic polymer composites, including reinforced organic polymer composites such as carbon fiber reinforced polymers (CFRP's) and epoxy carbon fiber thermoplastic composites.

In another example, alone or in combination with any one of the previous examples, the aqueous soluble polymer matrix is soluble in an aqueous alkaline media and removable from the metal surfaces. In another example, alone or in combination with any one of the previous examples, the alkaline-soluble polymer matrix comprises an acrylic polymer or copolymer.

In another example, alone or in combination with any one of the previous examples, the one or more dispersed or distributed compressible fillers comprise polymer particles present as an emulsion so as to provide for introduction of the compressible fillers with the polymer matrix. In another example, alone or in combination with any one of the previous examples, the polymer particles comprise polyolefins, thermoplastic elastomers, thermoset rubbers, polyureas, polyamides, polyfluorocarbons or combinations thereof.

In another example, alone or in combination with any one of the previous examples, the one or more compressible fillers are selected from clays, magnesium aluminum silicates, and/or calcium silicates. In another example, alone or in combination with any one of the previous examples, the one or more compressible fillers are polymer particles of microcrystalline polyethylene and the one or more non-compressible fillers are calcium silicates.

In another example, alone or in combination with any one of the previous examples, the method further comprises, after the contacting step, removing the aqueous coating composition with aqueous alkaline media.

In third example, an aerospace vehicle is contacted at least at a portion thereof with the temporary protective coating composition, as defined any one of the previous examples.

DETAILED DESCRIPTION

In one aspect, the present disclosure is directed to temporary protective coatings (TPC), e.g., typically a green film that covers the skin of aircraft during assembly and prior to final painting. The present disclosure provides for compositions comprising water-/alkaline-soluble polymer compositions comprising a compressible filler in combination with a non-compressible filler. By combining compressible fillers with non-compressible fillers, the temporary protective coating provides improved performance in resisting or eliminating indentations and scratching. The present disclosure provides such resistance in a temporary protective coating without requiring separate coatings or multiple layers of different coatings.

This disclosure relates to compression resistant and scratch/abrasion resistant temporary protective coatings. Such coatings, for example, reduce or eliminate indentations to metal skins in sheet form, such as transportation vehicles, during assembly. More specifically, this disclosure relates to coatings that afford protection against compression-related events that can impart surface topographical changes to thin metal sheet or forms, as a result of transport of the article, contact during assembly line or other assembly procedures, as well as high- or low-speed particle impact, abrasion, wear, vibration, solid particle erosion and liquid particle erosion that can result during transport, i.e., prior to or during assembly.

This disclosure also relates to a temporary, compression/indent resistant protective coating that is removable with organic-based or non-organic-based solvent. In one example, the temporary, compression/indent resistant protective coating is removable without organic solvent. In one specific example, this disclosure relates to temporary, protective coating that is substantially or completely removal by aqueous media or alkaline aqueous media. Media as used herein is inclusive of aqueous solutions, non-aqueous solutions, aqueous and non-aqueous mixtures, dispersions, emulsions, or gels comprising water and organic solvents.

The phrase "TPC composition" as used herein is inclusive of a fluid composition that is sprayable, or that can be brushed, onto a substrate surface, or into which the substrate can be dipped. The term "coating" is inclusive of a layer that is derived from the TPC composition and is substantially free from water and/or solvent, e.g., dried and/or cured TPC compositions.

The phrase "modified TPC composition" and its plural are used herein to be inclusive of a TPC composition that comprises an alkaline soluble polymer matrix and one or more compressible fillers in combination with one or more non-compressible fillers.

A "resultant modified TPC" as used herein is a resultant coating from the modified TPC compositions that is disposed directly or indirectly upon a substrate surface and can comprise one or more layers, one of which is derived from the modified TPC composition.

The phrase "disposed indirectly" refers to a coating that is separated from a substrate surface by other layers, while the term "disposed directly" refers to layers that are in intimate physical contact with a substrate surface. The term "disposed" refers generically to a coating that may or may not be separated from a substrate surface by other layers. The resultant modified TPC as used herein is a coating that is temporarily disposed upon the substrate surface and can comprise one or more layers, one of which is derived from the modified TPC composition, and is at least partially or completely removable. In one example, the present disclosure provides a resultant modified TPC that is at least partially or completely removable using an aqueous media. An aqueous media can include an alkaline aqueous media, for example, a media having a pH between about 7 and about 14, inclusive of the stated endpoints.

The term "substrate surface" is inclusive of one or more surfaces of vehicles. The term "vehicles" as used herein is inclusive of aerospace vehicles, automobiles, locomotives, ships, or the like. Substrate surfaces are inclusive of metals, metal alloys, ceramics, plastics, composites, and their combinations.

"Compressible fillers" are fillers that possess resiliency to external forces, e.g., possess one or more of measurable compression set resistance, compressive strength yield of thermoplastics, polyamides, and the like which are typically 5 MPa to 350 MPa (1000-50,000 psi), densities (g/m3) of less than 1.5, hardness of less than 90 Shore D, and/or exhibit plastic deformation under stress.

"Non-compressible fillers" are fillers that when used in combination with compressible fillers, possess properties that do not overlap those of the compressible fillers. For example, non-compressible fillers are inclusive of materials with substantially no plastic deformation under stress, greater than 90 Shore D hardness and/or Absolute Hardness of greater than 50 (where quartz has Absolute Hardness of 100, for example), and/or densities greater than 1.5 g/m$^3$. By way of example, non-compressible fillers are inclusive of inorganics. Inorganics as non-compressible fillers are inclusive of silicate, mineral, and clay fillers.

By way of example throughout this disclosure an aluminum aerospace vehicle fuselage is used as an exemplary "substrate" for demonstrating the applicability of the presently disclosed modified TPC. It is understood that other substrates of aluminum, aluminum alloys, titanium, titanium alloys, stainless steel, tin, tin alloys, copper, copper alloys, tungsten, tungsten alloys, composites and the like that are also subject to such environments would benefit from the presently disclosed modified TPC compositions and methods. Other substrates include components used for the assembly of trucks, buses, automobiles, marine vessels etc.

In one aspect, this disclosure improves conventional temporary coatings by the addition of a non-compressible filler that protects a substrate from scratches. In yet another aspect, this disclosure improves conventional temporary coatings by the addition of compressible filler in combination with a non-compressible filler that provides protection from scratches of the substrate in combination with attenuation of external impact energy to a substrate.

Each additive was added to a commercially available TPC composition separately, each provided an improvement to the characteristics of the resultant TPC when used as a temporary protective coating in the assembly of an aerospace vehicle. Specifically, the non-compressible filler was observed to attenuate forces that otherwise would scratch through the coating. When the compressible filler and the non-compressible filler are combined together with a commercially available TPC composition in the ranges previously stated both attenuation of scratch events and attenuation of dents/indents of the substrate coated with the TPC were observed compared to a comparative example of the commercially available TPC composition without the compressible filler and the non-compressible filler.

Thus, it was observed that addition of both a compressible filler and a non-compressible filler to an existing TPC composition provided a modified TPC composition with enhancement of both the scratch and indent resistance properties when used on metal aircraft during assembly. The resulting resultant modified TPC comprising the compressible filler and non-compressible filler were also observed to be removable from the substrate surface using aqueous media or aqueous alkaline media prior to final painting, for example.

The compositions and methods disclosed herein reduce the number of incurred events to the aluminum aircraft skin during assembly that require action. The present compositions and methods reduce inspection time and labor needed (blending, sanding, re-application of the coating, etc.). The assembly line flow time of the aircraft is improved, for example, and assembly cost is reduced.

Modified TPC Composition

Organic polymer matrixes that can be used in the modified TPC composition as well as in the resultant modified TPC include one or more aqueous media or aqueous alkaline-media soluble polymers that facilitate the dissolution/removal of the polymer matrix from a substrate surface when contacted by aqueous media or alkaline-media. Examples of such aqueous media or alkali-media soluble organic polymer matrixes include thermoplastic polymers, thermosetting polymers, or blends and copolymers of thermoplastic polymers with thermosetting polymers. Examples of suitable organic polymers are dendrimers, elastomers, ionic polymers, copolymers such as block copolymers, graft copolymers, random copolymers, star block copolymers, or the like. The organic polymer matrices may comprise elastomers.

The organic polymer matrices can comprise polyacetals, polyureas, polyurethanes, polyolefins, polyacrylics, polycarbonates, polyalkyds, polystyrenes, polyesters, polyamides, polyaramides, polyamideimides, polyarylates, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfonamides, polyphosphazenes, polysilazanes, polysiloxanes, polyolefins, fluoropolymers, polybutadienes, polyisoprenes, or a combination comprising at least one of the foregoing organic polymers.

Exemplary aqueous alkaline soluble organic polymer matrices are polyacrylics. The aforementioned organic polymer matrices listed above can be blended and/or copolymerized with the polyacrylic if desired. In one example, the acrylic polymer or copolymer of the presently disclosed modified TPC composition comprises 2-propenoic acid, 2-methyl-, polymer with ethenylbenzene, ethyl 2-propenoate, methyl 2-methyl-2-propenoate and 1, 2-propanediol mono (2-methyl-2-propenoate).

In one example, the presently disclosed modified TPC composition comprises an aqueous composition of acrylic polymer or copolymer fully or substantially soluble in and removable from a substrate surface using an aqueous media or aqueous alkaline media. In one example, the presently disclosed modified TPC composition comprises an alkaline-soluble resin comprising an acrylic polymer or copolymer fully soluble in and removable from a substrate surface using an aqueous alkaline media. By way of example, TPC compositions that exclude an alkaline-soluble polymer or copolymer that are not 100% soluble in aqueous alkaline media and become increasingly difficult to remove completely from a substrate surface over time and after exposure to the environment. In contrast, the resultant modified TPC of the present disclosure comprising an aqueous media- or aqueous alkaline media-soluble polymer matrix is completely removable from a substrate surface due to the modified TPC comprising an aqueous media or alkali-media soluble organic polymer matrix.

In one example, a commercially available aqueous soluble TPC is modified to include the compressible filler and the non-compressible filler. The modified TPC composition may optionally also include organic solvents, surfactants, other acrylic polymers or copolymers, non-acrylic polymers or copolymers, plasticizers, leveling agents, biocides, rheology modifiers, and defoamers that otherwise do not substantially affect the functionality of the compressible filler and non-compressible filler.

Non-aqueous solvents, if used, for example, to homogenize the modified TPC compositions can include glycol ethers for example diethylene glycol monoethylether. Surfactants may be used to assist with emulsifying the aqueous-/alkaline-soluble polymer or copolymer and/or optionally one or more of the added polymer particles and/or compressible filler. Examples of aqueous soluble commercially available TPC's are ZR-6320, ZR-6321, ZR-6322, ZR-6323, Spraylat Temporary Coating (Green), and 63GN011G water-borne, single component Low VOC Alkaline Strippable Coating (PPG Aerospace, Sylmar, Calif.); Transseal HWAS Green 989-6204; and Aerogarde Green 989-6614 (Groco Specialty Coatings, Dallas, Tex.).

Compressible Fillers

Examples of compressible organic fillers include by way of example, one or more polymer particles. Polymer particles are inclusive of polyolefins, fluoropolymers, polyurethanes, polyurea, polyamides, thermoplastic elastomers and thermoset rubbers. In one example polyethylene, polypropylene, polyethylene-polypropylene copolymers and the like can be used as compressible organic materials in the presently disclosed TPC. In one example, crystalline polyethylene, microcrystalline polyethylene, or partially crystalline polyethylene, is used. Examples of fluoropolymer include, but are not limited to, PVF (polyvinylfluoride), PVDF (polyvinylidene fluoride), PCTFE (polychlorotrifluoroethylene), PFA (perfluoroalkoxy polymer), FEP (fluorinated ethylene-propylene), ETFE (polyethylenetetrafluoroethylene), ECTFE (polyethylenechlorotrifluoroethylene), perfluoropolyoxetanes, and polytetrafluoroethylene (TEFLON™). Non-limiting examples of compressible fillers that are polymer particles include TEXTURE ULTRA FINE® microcrystalline polyethylene emulsion (Shamrock Industries), and ORGASOL® ultrafine polyamide powders (Arkema; King of Prussia, Pa.).

In one example, the modified TPC composition comprises suspended and/or dispersed polymeric beads and/or polymeric flakes as the compressible filler. In another example, the polymeric beads comprise one or more polyolefin polymers. The polyolefin polymers of the polymer particles include, for example, polyethylene, and copolymers thereof. The polyolefin polymers of the polymer particles may be crystalline, semi-crystalline, amorphous, or blends thereof. Non-acrylic polymer or copolymer aqueous dispersions for use in the disclosed modified TPC compositions may include beads of thermoplastic elastomers, such as ethylene copolymers, urea polymer, thermoset rubber, styrene-butadiene-rubber, butadiene-rubber, polyurethane elastomer, silicone elastomer, and the like. Suitable polymer particles include TEXTURE ULTRA FINE product (microcrystalline polyethylene) available from Shamrock (Newark, N.J.); PERGOPAK M3 and PERGOPAK M5, polymethyl urea resin with reactive methylol groups (Huber Engineered Materials, Atlanta, Ga.).

The polymer particles can be beads, flakes, or rods or be of other shapes or combinations of shapes. The polymer particles can have average particle sizes of about 1 to about less than or equal to 100 micrometers. In one example, the polymer particles have an average particle size of 2 to about 75 micrometers. In another example, the polymer particles have an average particle size of 10 to about 50 micrometers.

The volume of the compressible filler added to the modified TPC composition is in an amount of up to about 13 percent pigment volume concentration (PVC), so as to attenuate scratching and indentation of the substrate and is based on the total volume of the modified TPC composition. In one example, the volume of the polymer particles added to the modified TPC composition in an amount of about 1 percent PVC to about 5 percent PVC, based on the total volume of the modified TPC composition. In one example, the amount of polymer particles was about 1.4 percent PVC to about 4 percent PVC of the modified TPC composition. In another example, the volume of the polymer particles added to the modified TPC composition in an amount of about 2 percent PVC to about 4 pigment percent PVC, based on the total volume of the modified TPC composition. In another example, the volume of the polymer particles added to the modified TPC composition in an amount of about 3 percent PVC to about 4 pigment percent PVC, based on the total volume of the modified TPC composition. The percent volume of the polymer particles can be varied in accordance with the properties of the polymeric particles used in the polymer particles so as to achieve desired protective coating properties in the resultant modified TPC.

The compressible filler, when used in an amount of about 0.05 volume % to about 2 volume % to the modified TPC composition the required force to indent an aluminum surface through the coating was increased relative to a TPC composition without the compressible filler. The percent volume of the compressible filler can be varied in accordance with the properties of the compressible filler so as to achieve desired protective coating properties in the resultant modified TPC.

Non-Compressible Fillers

Non-compressible fillers are chosen from inorganic materials. In one example, the non-compressible fillers are chosen from inorganic minerals. Examples of inorganic mineral non-compressible fillers include clays, for example, kaolinite clay or montmorillonite-smectite clay, magnesium aluminum silicates, and/or calcium silicates, e.g., wollastonite ($CaSiO_3$) and combinations thereof.

In one example, the volume of the non-compressible filler is added to the modified TPC composition in an amount of up to about 5 percent PVC, based on the total volume of the modified TPC composition. In one example, the volume of the compressible filler is added to the modified TPC composition in an amount of about 0.1 percent PVC to about 5 percent PVC, based on the total volume of the modified TPC composition. In another example, the volume of the compressible filler is added to the modified TPC composition in an amount of about 0.5 percent PVC to about 4 percent PVC, based on the total volume of the modified TPC composition. In another example, the volume of the compressible filler is added to the modified TPC composition in an amount of about 1 percent PVC to about 3 percent PVC, based on the total volume of the modified TPC composition. The amounts or volume of non-compressible filler and compressible filler may be modified to protect different substrate material surfaces coated with the modified TPC composition against scratches and indents.

The substrate surface can be coated with the modified TPC composition by spray coating, dip coating, brush coating, electrostatic painting, or the like to a desired thickness so as to provide resistance against or attenuation of dents/indents, abrasion, wear and erosion. Other coating techniques may be used. While the attenuation of dents and abrasion can be correlated with the thickness of the modified TPC composition, a thin coating, for example, 0.5 to 4 mils (0.013-0.102 mm) provides for reduced material costs and/or environmental impact when the coating is removed.

The presently disclosed resultant modified TPC is easily solubilized or emulsified and removable by a stream of water or aqueous alkaline media, collectively "strippers." In one example, strippers are aqueous alkaline media having a pH>7 to ≤14. Non-limiting examples of strippers include solutions containing 5-10 wt. % monoethanolamine, 1-5 wt. % caprylic acid, 5-10 wt. % ethylene glycol monophenyl ether having a pH of about 10.5±0.5; 0.5-1.5 wt. % sodium alkylbenzene sulphonate, 7-13 wt. % butyl carbitol having a pH of about 10.4. Other commercially available strippers may be used.

In one example, the resultant TPC excludes a peelable-like TPC or film, e.g., one that is removed manually in sheet or film form from the surface of the substrate.

In one exemplary example, the resultant TPC can comprise a layer of primer, a base coat layer, an optional tie layer and a top coat layer, wherein one of these layers is derived from the modified TPC composition and the resultant TPC generally has a tensile strength of greater than or equal to about 1000 psi (70 kg/cm2), a tensile elongation at break of greater than or equal to about 350% for sprayable coatings, a tensile set at break of less than or equal to about 60%, In the exemplary example, the base coat layer may be optional, or the top coat layer may be optional.

The modified TPC composition can also comprise an optional organic solvent. Organic solvents may be protic solvents, aprotic solvents, or mixtures comprising at least one of the foregoing solvents. Examples of suitable organic solvents are methanol, ethanol, propanol, toluene, xylene, butyl acetate, propyl acetate, methyl isobutyl ketone, methyl n-amyl ketone (MAK), methoxypropyl acetate, N-methylpyrrolidone, mono- and di-glycol ethers or a combination comprising at least one of the foregoing solvents.

Modified TPC compositions can also be substantially solvent-free. In those situations where the modified TPC composition has a low enough viscosity (without the use of solvent or water), solvents may be excluded from the modified TPC composition and the modified TPC composition would then be referred to as being 100% solids.

When solvent is added to the modified TPC composition, it is generally added in an amount of about 2 to about 60 volume %, based on the total weight of the modified TPC composition, for example, to facilitate mixing and/or dispersion of the components of the modified TPC composition. In one example, the solvent is added to the modified TPC composition in an amount of about 5 to about 55 volume %, based on the total weight of the modified TPC composition. In another example, the solvent is added to the modified TPC composition in an amount of about 10 to about 50 volume %, based on the total weight of the modified TPC composition. In yet another example, the solvent is added to the modified TPC composition in an amount of about 40 to about 45 volume %, based on the total weight of the modified TPC composition.

Other optional additives useful in the modified TPC compositions include leveling agents, defoamers, hydrolysis stabilizers, UV stabilizers, pigments, dispersants, curing accelerators, diluents, or combinations thereof. In one example, optional additives described above are included in the present composition. In another example, optional additives described above are excluded from the present composition.

These fillers can be added to the modified TPC composition at concentrations effective to obtain desired properties. Other fillers that can be used to control dielectric constants, for example, are well known. Examples include various metal oxides, metal powders, metal fibers, or the like, or a combination comprising at least one of the foregoing fillers.

The modified TPC composition can be applied in one or more layers to the substrate surface in order to create a protective coating. The modified TPC composition can be applied in one or more layers to the substrate surface in order to create a temporary protective coating.

The modified TPC composition can be applied in a single step or in multiple steps and can exist in the form of a single layer or multiple layers. These layers can have the same or different compositions. The resultant modified TPC can therefore consist of a single layer applied to the substrate surface. Alternatively, the resultant modified TPC can comprise multiple layers, wherein one of the layers comprises a coating that is derived from the modified TPC composition. One or more applications of the modified TPC composition may be applied to the substrate surface so as to provide a resultant modified TPC having a targeted thickness, targeted tensile strength. These methods of application of the modified TPC composition are suitable for the formation of a resultant modified TPC on various substrate surfaces, e.g., metals, plastics, wood, composites, cement, concrete or glass. In one example, the modified TPC compositions are suitable for the formation of a resultant modified TPC on all or part of an aerospace vehicle, for example during manufacture.

The surface of the substrate to be coated with the modified TPC composition may optionally be treated (i.e., cleaned or modified) to improve adhesion to the substrate surface. A primer can be applied to the substrate surface to be coated with the modified TPC composition for corrosion protection, or to enhance the removal of the resultant modified TPC. Examples of suitable corrosion resistant primers are epoxy and polyurethane coatings containing corrosion inhibitors. "Wash primers" comprising polyvinyl butyral chemistry and the like can also be used, because of their solubility in aqueous media, to assist the removal of the resultant modified TPC. An exemplary primer is a water borne epoxy primer. The modified TPC composition can then be coated onto a primer layer (or base coat layer) to form a top coat layer. The substrate surface may also optionally be treated by coating it with a layer of primer, a base coat layer, a tie layer and a top coat layer if desired. The optional surface treatment is conducted for purposes of cleaning the surface of the substrate surface and for purposes of improving adhesion between the modified TPC composition and the substrate surface. Treating the surface may involve mechanical roughening, grit blasting, sanding, cleaning, chemical etching, plasma treatment, chemical conversion coating, or other processes known to improve the adhesion to the substrate surface of primers or coatings applied later in the process.

In one example, the primer, the base coat layer as well as the top coat layer can all be derived from the modified TPC composition. In another example, only the top coat layer can be derived from the modified TPC composition. After the application of an optional primer and a base coat, the modified TPC composition may be applied to the substrate surface to form a resultant modified TPC that provides a high resistance to indentation via impact, wear, abrasion and/or vibration.

In the spraying process, modified TPC compositions having different amounts and/or types of solvent can be used to form the coating layers on the substrate surface. For example, when the non-aqueous, coatings use moisture curing mechanisms, aqueous coatings can be used sequentially with non-aqueous coatings. In another example, the aqueous modified TPC compositions can be used to form all of the protective coating layers (e.g., the layer of primer, base coat layer, tie layer, or the like) other than the top coat layer, while a non-aqueous modified TPC composition is used as the final top coat.

In another method of using the modified TPC composition, alternating layers or any random combination of the aqueous and non-aqueous modified TPC compositions may be sprayed in any sequence to form the protective coating. The combined use of aqueous and non-aqueous sprayable modified TPC compositions provides a method of reducing the overall water sensitivity of aqueous coatings, while reducing the amount of organic solvents used to form the resultant modified TPC.

In one example, after the application of the modified TPC composition to the substrate surface, the resultant modified TPC can be at least partially or fully cured by moisture curing and/or heat curing. If solvent is present in the modified TPC composition, it is desirable to drive off substantially all of the moisture during the curing process. The coatings may be cured at either ambient temperature (e.g., by air drying or so-called forced drying), or at an elevated temperature (heat curing). A heat curing process to effect curing and to drive off the solvent can utilize heat from convection, conduction and/or radiation. Electromagnetic radiation in the form of microwave radiation, infrared radiation, ultraviolet radiation, or visible light radiation and combinations thereof can be used to facilitate curing, set up, or drying.

The resultant modified TPC provides protection to surfaces of aerospace vehicles during manufacturing. The resultant modified TPC can be used to protect aircraft wings, fuselage, nose cones, radomes, or the like, to protect them from scratches/indents due to manufacturing processes. Other applications may include coatings for motor or marine vehicles, in which the substrate surfaces are subjected to damage caused by assembly-line impact and vibration, or the like.

EXAMPLES

The following examples, which are meant to be exemplary, not limiting, illustrate compositions and methods for manufacturing and using the protective coatings described herein. Examples 1 to 5, comprising an alkaline-soluble polymer matrix comprising an acrylic polymer or copolymer, were uniformly applied to a test turbine blade using an airless spray system or a flow applicator. Approximately 4 to 6 mL of the modified TPC composition is used for each square foot of surface to be protected, yielding a uniform dried thickness of 0.5 to 4 mils (0.013-0.102 mm). Alternatively, the modified TPC composition is applied to the surface and uniformly spread across the surface using a painting brush, pad, or spray can. The modified TPC composition may also be applied by dipping an applicator into the modified TPC composition and uniformly applying the applicator and modified TPC composition across the substrate surface.

The coated substrate surface is then allowed to dry depending on environmental conditions and the thickness of the coating composition applied to the surface. The modified TPC composition acquires stable mechanical properties as the resultant modified TPC within approximately 24 hours.

To substantially or completely remove the resultant modified TPC from the surface, an aqueous alkaline media is applied to the coated surface using a spray system or a non-abrasive cleaning pad to convert the alkaline-soluble temporary protecting coating into a water-soluble material. Water rinsing is used to remove the water-soluble material.

Exemplary TPC compositions were used as comparative examples and are generally chrome-free, water-based coatings formulated for the temporary protection of aluminum surfaces during manufacturing operations such as roll forming, stretch bending, drop-hammer and riveting operations and provide an abrasion-resistant, transparent film. Exemplary TPC compositions used as comparative examples included ZR-6320, ZR-6321, ZR-6322, and ZR-6323 (PPG Aerospace, Sylmar, Calif.); Spraylat Temporary Coating (Green); and 63GN011G water-borne, single component Low VOC Alkaline Strippable Coating (PPG Aerospace Industries); Transseal HWAS Green 989-6204; Aerogarde Green 989-6614 (Groco Specialty Coatings, Dallas, Tex.). Typically, the TPC compositions comprise approximately 33 wt % solids of polymer matrix.

Experimental examples were prepared as disclosed in Table 1. Primers used included 10P20-44MNF and 10P20-44, both high solids epoxy primers (Azko Nobel) or CA 7502 chrome free epoxy primer (PPG Aerospace, Sylmar, Calif.). Primers were applied at a 0.5 mil (0.013 mm) or 0.95 mil (0.024 mm) targeted thickness. Exemplary polymer particles tested included TEXTURE ULTRA FINE microcrystalline polyethylene emulsion (Shamrock Industries) and an exemplary compressible inorganic filler of Vansil W50 (wollastonite, Vanderbuilt Minerals LLC).

The total weight percent of combination of polymer particles and non-compressible filler was approximately 8-15 weight percent solids in the resultant modified TPC at an average thickness of 2 mils (0.05 mm) or less. The commercially available TPC was added to a mixing container together with the polymer particles and non-compressible filler and mixed at 500 RPM for 2 minutes without vacuum, then 2000 RPM for 15 minutes without vacuum, and finally at 2000 RPM for one minute without vacuum. The TPC formulations were spray coated on the samples using a spray gun and a temperature and humidity controlled painting booth and forced air convection oven for drying. Coatings are typically dried in air at ambient temperature. For aerospace vehicles, paint hangars can be used and may be temperature controlled to about 49° C. (120° F.) for several hours to accelerate the drying process. Removal of the TPC can be performed by spraying the aerospace vehicle surface with the desired cleaning agent with a pressure hose system. As the TPC is green in color, the removal process is visually apparent. The aerospace vehicle is then rinsed with clean water.

TPC compositions, without the combination of polymer particles and compressible fillers, were used as Comparative Examples and subjected to testing concurrently with the presently disclosed compositions.

Scratch Test-Scratch and Indent results were evaluated in a method similar to ASTM D7027-13, in three ways using a stylus as follows:

First Scratch Through (Point at which metal is first observed in the scratch)

Total Scratch Through (Represents the point at which there is no coating under the stylus).

Indent threshold (Coating removed for this test and a point where a finger nail catches on the scratch is found and related back to the force that was applied at that point. (Indent is usually occurring in the clad before the stylus breaks through the TPC.)

Figure 1:
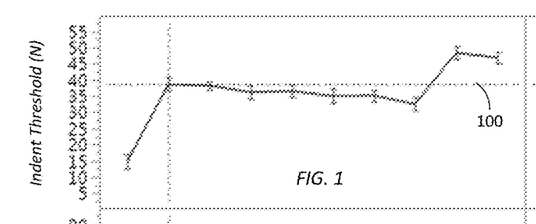
FIG. 1 depicts Indent Threshold experimental data of controls and samples prepared in accordance with the present disclosure.
Figure 2:
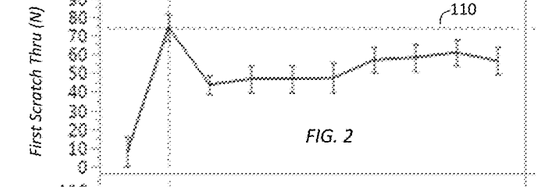
FIG. 2 depicts First Scratch Through experimental data of controls and samples prepared in accordance with the present disclosure.
Figure 3:
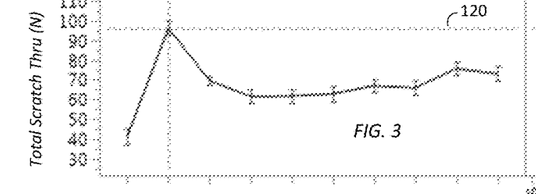
FIG. 3 depicts Total Scratch Through experimental data of controls and samples prepared in accordance with the present disclosure.
Figure 4:
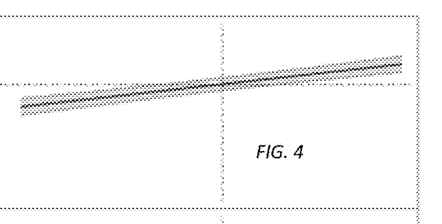
FIG. 4 depicts coating thickness variation for Indent Threshold experimental data of controls and samples prepared in accordance with the present disclosure.
Figure 5:
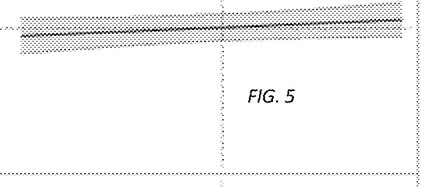
FIG. 5 depicts coating thickness variation for First Scratch Through experimental data of controls and samples prepared in accordance with the present disclosure.
Figure 6:
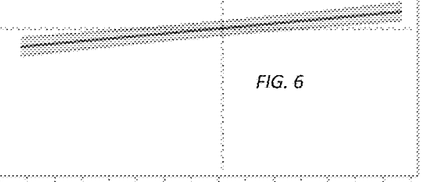
FIG. 6 depicts coating thickness variation for Total Scratch Through experimental data of controls and samples prepared in accordance with the present disclosure.

The position on the scratch is related back to the amount of force (N) that was applied in the Z Load for Indent Threshold, Total Scratch Through, and First Scratch Through (lines 100, 110, and 120 on the graphs of FIG. 1, FIG. 2, and FIG. 3, respectively, being 39 N, 74 N, and 96 N, respectively) for a representative sampling from Table 1. Indent is usually occurring in the clad before the stylus breaks through the coating. FIGS. 4, 5, and 6 depict the thickness variation effects of the Indent Threshold, Total Scratch Through, and First Scratch Through for this data set.

The data of Table 2 shows presently disclosed resultant modified TPC's providing improved resistance to indentation and scratch as demonstrated by comparable or better Scratch Through performance values and superior Indent Pressure thresholds than control TPC's without the combination of compressible fillers and non-compressible fillers.

While the disclosure has been described with reference to exemplary examples, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular example disclosed as the best mode contemplated for carrying out this disclosure, but that the disclosure will include all examples falling within the scope of the appended claims.

TABLE 1

Presently disclosed modified TPC compositions.

| Sample # | Base TPC | Non-compressible Filler | Polymer Particles % PVC | Compressive Filler | Compressive Filler % PVC |
|---|---|---|---|---|---|
| 1 | 63GN011G | None | | None | |
| 2 | ZR6320 | None | | none | |
| 3 | ZR6320 | Vansil W50 | 10 | Texture Ultra Fine | 5 |
| 4 | ZR6321 | Vansil W51 | 10 | Texture Ultra Fine | 5 |
| 5 | ZR6322 | Vansil W52 | 10 | Texture Ultra Fine | 5 |
| 6 | ZR6323 | Vansil W53 | 10 | Texture Ultra Fine | 5 |
| 7 | ZR6320 | Vansl W50 | 2.5 | Texture Ultra Fine | 5 |
| 8 | ZR6320 | MP1538 | 5 | None | |
| 9 | ZR6320 | MP4526 | 5 | None | |
| 10 | ZR6320 | MP1538 | 5 | Texture Ultra Fine | 5 |
| 11 | ZR6320 | MP4526 | 5 | Texture Ultra Fine | 5 |
| 12 | ZR6320 | Vansil W50 | 5 | Texture Ultra Fine | 5 |
| 13 | ZR6320 | Vansil W50 | 5 | Texture Ultra Fine | 5 |
| 14 | ZR6320 | Vansil W50 | 5 | Texture Ultra Fine | 5 |
| 15 | ZR6320 | Vansil W50 | 5 | PergoPak M3 | 5 |
| 16 | ZR6320 | Vansil W50 | 5 | PergoPak M5 | 5 |

TABLE 2

Resultant Modified TPC properties. All TPC were approximately 0.8-1.5 mils. 10P20-44MNF primers was 0.5 mils and 10P20-44 primer was 0.95 mils. Damage resistance was dependent on applied primer thickness. Areas where primer has been scratched through would require rework.

| | Specific Mtl | Scratch Through (N) | Indent Pressure (N) | Re-movability | VOC (g/l) |
|---|---|---|---|---|---|
| Comparative TPC's | ZR6320 (QPL) | 84 | 31 | Good | 85 |
| | 63GN011G (QPL) | 38 | 10 | Okay | 1 |
| Primers | 10P20-44MNF | 43 | ≤5 | N/A | 350 |
| | 10P20-44 | 31 | ≤5 | N/A | 350 |
| Resultant modified TPC | ZR6320 + polymer particles and compressive fillers | 74 | 45 | Good | 85 |

We claim:

1. A temporary protective coating composition for protecting metal surfaces from indentation and scratching, the temporary coating composition comprising:
    an aqueous soluble polymer matrix;
    one or more compressible fillers; and
    one or more non-compressible fillers.

2. The temporary protective coating composition of claim 1, wherein the aqueous soluble polymer matrix is soluble in an aqueous alkaline media and removable from the metal surfaces.

3. The temporary protective coating composition of claim 1, wherein the aqueous soluble polymer matrix comprises an acrylic polymer or copolymer.

4. The temporary protective coating composition of claim 1, wherein the one or more compressible fillers are polymer particles present as an emulsion therein.

5. The temporary protective coating composition of claim 1, wherein the one or more compressible fillers comprise polyolefins, thermoplastic elastomers, thermoset rubbers, polyureas, polyamides, fluoropolymers, or combinations thereof.

6. The temporary protective coating composition of claim 1, wherein the one or more compressible fillers are polymer particles and the one or more non-compressible fillers are inorganic minerals.

7. The temporary protective coating composition of claim 6, wherein the one or more non-compressible fillers are selected from clays, magnesium aluminum silicates, and/or calcium silicates.

8. The temporary protective coating composition of claim 6, wherein the polymer particles are microcrystalline polyethylene and the one or more non-compressible fillers are calcium silicates.

9. The temporary protective coating composition of claim 1, further comprising one or more of a plasticizer, a leveling agent, an organic solvent, a surfactant, a rheology modifier, a biocide, or a defoamer.

10. A method of protecting against indentation and scratching of a substrate surface in need thereof, the method comprising:
    contacting a substrate surface with a protective coating comprising layer being selected independently from an aqueous coating composition comprising:
    an aqueous soluble polymer matrix;
    one or more compressible fillers; and
    one or more non-compressible fillers; and
    providing protection of the substrate surface against indentation and scratching.

11. The method of claim 10, further comprises contacting the substrate surface with a primer coating prior to the contacting of the substrate surface with the protective coating.

12. The method of claim 10, wherein the substrate surface comprises one or more of aluminum, painted aluminum, aluminum alloy, anodized aluminum, titanium, titanium alloy, stainless steel, carbon fiber reinforced polymer (CFRP), or epoxy carbon fiber thermoplastic composites.

13. The method of claim 10, wherein the aqueous soluble polymer matrix is soluble in an aqueous alkaline media and removable from the metal surfaces.

14. The method of claim 10, wherein the aqueous soluble polymer matrix comprises an acrylic polymer or copolymer.

15. The method of claim 10, wherein the one or more compressible filler is dispersed or distributed polymer particles present as an emulsion.

16. The method of claim 15, wherein the polymer particles comprise polyolefins, thermoplastic elastomers, thermoset rubbers, polyureas, polyamides, fluoropolymers, or combinations thereof.

17. The method of claim 10, wherein the one or more non-compressible fillers are selected from clays, magnesium aluminum silicates, and/or calcium silicates.

18. The method of claim 10, wherein the one or more compressible fillers are polymer particles of microcrystalline polyethylene and the one or more non-compressible fillers are calcium silicates.

19. The method of claim 10, further comprising, after the contacting step, removing the aqueous coating composition with aqueous alkaline media.

20. An aerospace vehicle contacted at least at a portion thereof with the temporary protective coating composition, as defined in claim 1.

* * * * *